United States Patent [19]

Feller

[11] Patent Number: 4,829,833
[45] Date of Patent: May 16, 1989

[54] LIQUID IMPEDANCE FLOW MONITORS

[76] Inventor: Murray F. Feller, P.O. Box 1247, Dunnellon, Fla. 32630

[21] Appl. No.: 122,471

[22] Filed: Nov. 2, 1987

Related U.S. Application Data

[63] Continuation of Ser. No. 797,611, Nov. 12, 1985, abandoned.

[51] Int. Cl.$^4$ .............................................. G01F 1/10
[52] U.S. Cl. ................................................ 73/861.77
[58] Field of Search ........... 73/861.77, 861.79, 861.89; 324/176

[56] References Cited

U.S. PATENT DOCUMENTS

| | | | |
|---|---|---|---|
| 3,564,915 | 2/1971 | Tomota et al. | 73/861.22 |
| 4,157,660 | 6/1979 | Spacett | 73/861.05 |
| 4,333,354 | 6/1982 | Feller | 73/861.77 |
| 4,399,696 | 8/1983 | Feller | 73/861.77 |
| 4,535,637 | 8/1985 | Feller | 73/861.77 |
| 4,561,310 | 12/1985 | Banard et al. | 73/861.24 |

FOREIGN PATENT DOCUMENTS

| | | | |
|---|---|---|---|
| 2479978 | 10/1981 | France | 73/861.77 |
| 804333 | 11/1958 | United Kingdom | 73/861.77 |

Primary Examiner—Herbert Goldstein

[57] ABSTRACT

Flow monitors are disclosed for liquid like tap water having limited electrical conductivity, including a flow sensor and a circuit connected to electrodes in the flow sensor for producing flow-representing signals. Vanes of a flow-activated rotor made of insulation displace part of the pattern of current paths between the flow-sensor's electrodes. Circuits connected to the electrodes include a d-c or a-c excitation source and an impedance in series with the electrodes for providing amplitude-varying signal output. The steady-state excitation voltage at the electrodes is maintained constant despite diverse resistivities of various liquids, and the series impedance is much higher than the resistance between the electrodes. D-c excitation promotes economical utilization of a long-life circuit-energizing battery. With d-c excitation, the positive electrode is of platinum or other material that serves as an electro-chemically inert anode in the liquid.

30 Claims, 3 Drawing Sheets

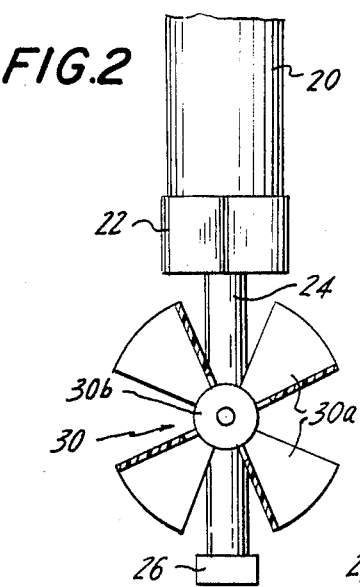
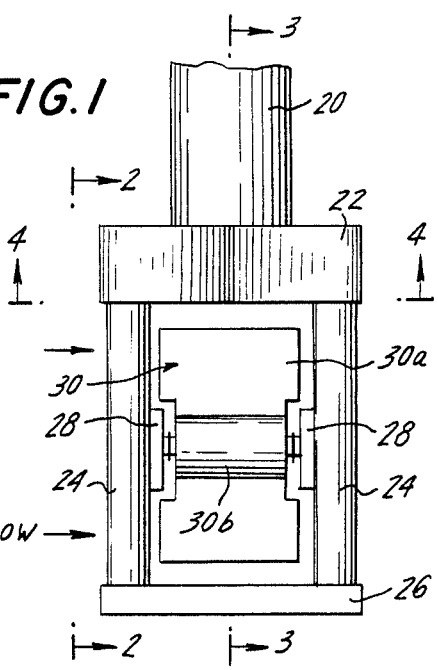
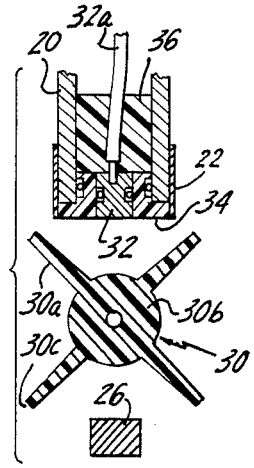
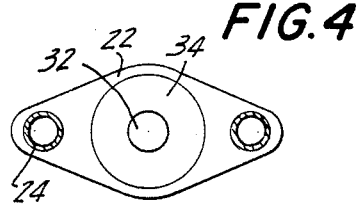
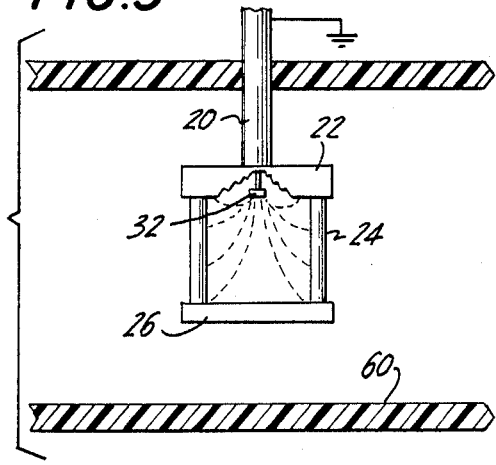
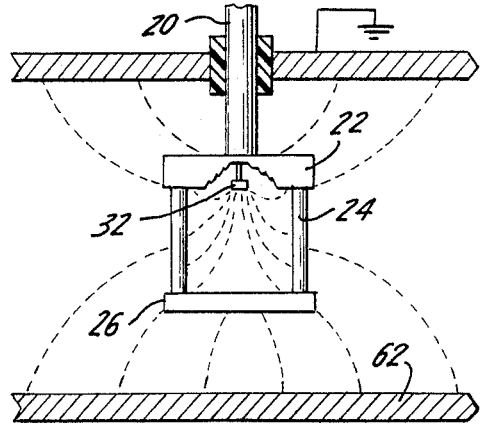

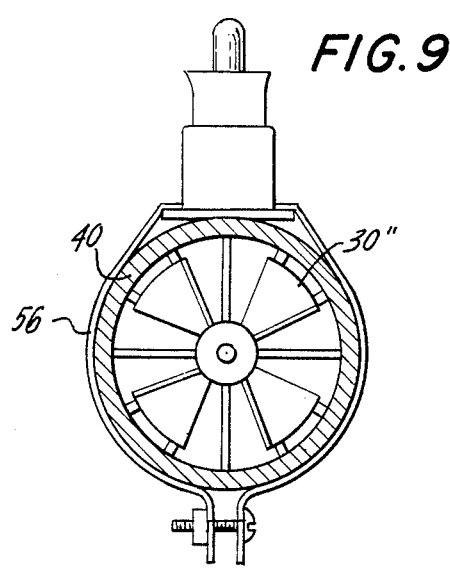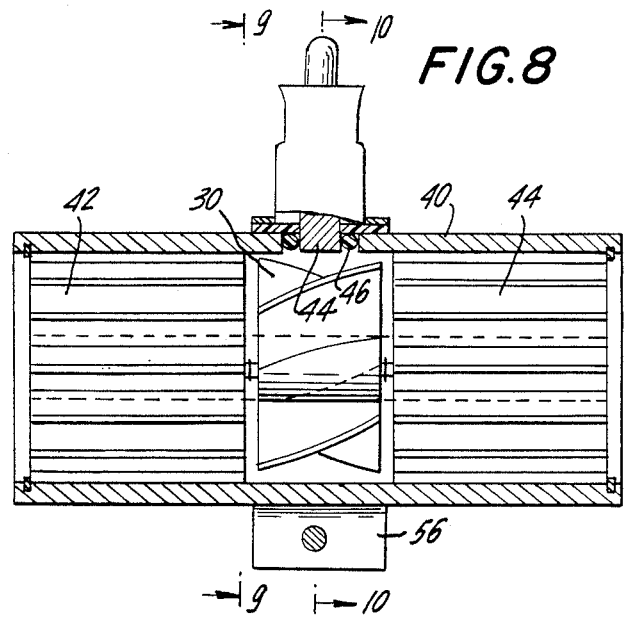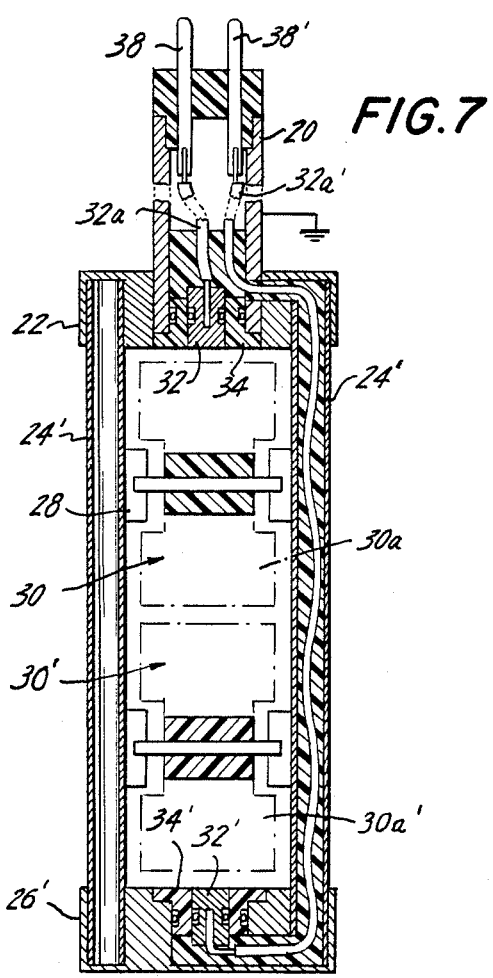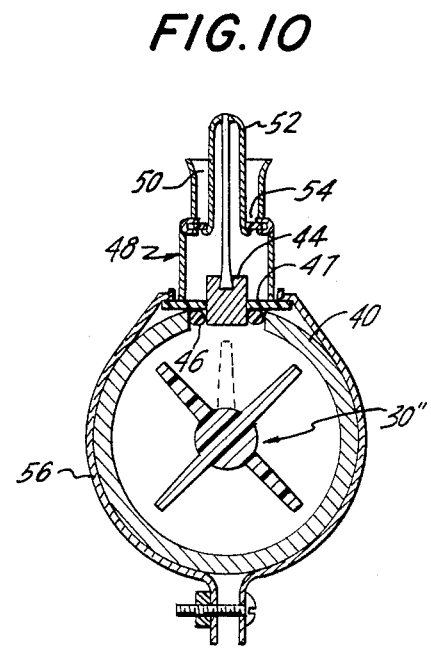

LIQUID IMPEDANCE FLOW MONITORS

This application is a continuation of application Ser. No. 797,611, filed Nov. 12, 1985, now abandoned.

This invention relates to apparatus for monitoring the flow of liquid of the kind that is capable of limited electrical conductivity, notably tap water.

BACKGROUND

A known form of flow-monitoring apparatus involves electrical conduction in flowing liquid, disclosed in British Pat. No. 804,333 dated Nov. 12, 1958. There, two electrodes are exposed to flowing water, a reference electrode and a sensing electrode. The electrodes and the water between them form an arm of an alternating-current Wheatstone bridge. The a-c exited electrodes are of gold or gold-plated to resist corrosion. The sensing electrode is a fine wire having its exposed end disposed close to the path of a flow-driven propeller's blade tips. Another arm of the bridge may be a resistor, or it may be the water's impedance between the reference electrode and a third electrode downstream of the propeller. The output signal, when demodulated, is a series of sharp pulses. Performance depends on the propeller's blade tips being critically close to the fine sensing electrode for largely blocking conduction briefly as each blade tip passes the fine electrode.

Another form of flow sensor that also depends on electrical conduction in the flowing liquid is disclosed in my U.S. Pat. No. 4,333,354. There, multiple electrodes are exposed to water or other liquid having limited electrical conductivity. Alternating-current excitation is applied to the electrodes (direct-current also being mentioned) so that a pattern of current paths forms in the liquid. Vanes of a flow-activated rotor move successively into position clear of the current paths between two electrodes and into position wherein a substantial portion of the current paths would extend through the thickness of the vanes but is suppressed thereby. That performance depends on the described relationship between the electrodes and vanes.

My U.S. Pat. Nos. 4,399,696 issued Aug. 23, 1983 and 4,535,637 issued Aug. 20, 1985 also involve vanes of a flow-activated rotor alternately becoming a barrier to current paths in the liquid and freeing the current paths in providing a sensed signal. In those patents, an a-c or pulsed excitation pattern of current paths is variably affected by rotor vanes; the sensed signals are phase-compared to the excitation signal for producing flow-representing pulses.

Thus, alternating-current excitation has been used in flow monitors having electrodes exposed to liquid that exhibits some conductivity. In such flow monitors, the excitation frequency is much higher than the frequency of the vanes passing the sensing electrode(s) at the maximum flow rate, so that such apparatus routinely includes its own excitation-frequency generator. Flow monitors are often installed in locations where electrical service is not available, so that batteries of the long shelf-life type are used for providing energy to operate the circuit. The electrical energy requirement of the excitation generator and the demodulation circuit usually represents a large proportion of the total energy needed by the flow-monitoring apparatus. Where a battery is used, a circuit that depends on a local carrier-frequency signal generator leads to the expense of an unduly large and costly long-life battery, e.g. lithium cells, or more-or-less frequent service calls are needed for replacing the battery. Avoiding a battery entails the cost of providing electrical service to the flow-monitoring apparatus.

A still further consideration of flow-monitoring apparatus of the kind that involves electrical conduction through the flowing liquid is that the apparatus, as constructed, may be used with liquid whose resistivity may be any sustained value in a wide range. For example, sea water has vastly greater conductivity than tap water, and even the conductivity of tap water differs at different locations and from time to time. One effort toward adapting flow-monitoring apparatus to liquids of various resistivities is found in British Pat. No. 804,333 where a Wheatstone bridge includes what may be called a measurement arm comprising the sensing electrode and a reference arm with a separate electrode. A third electrode common to both arms is also used. The resistances of both arms vary together, in proportion to the resistivity of the flowing liquid. However, in the Wheatstone bridge, reduced resistance of the vane-responsive arm is accompanied by reduced signal amplitude representing the flow. In addition, the requirement of three electrodes exposed to the liquid is a factor that complicates and involves significant expense to the structural portion of the flow-monitoring apparatus.

In my U.S. Pat. No. 4,535,637, supra, the disclosed flow-monitoring apparatus has a long-time-constant feedback circuit between the demodulated output circuit and the sensed signal input circuit. That apparatus implicitly involves a-c or pulsed excitation and it also depends on the provision of both excitation and sensing electrodes.

SUMMARY OF THE INVENTION

An object of this invention, in one of its aspects, resides in providing novel flow-monitoring apparatus of the type that includes a flow-activated vaned rotor, especially a turbine-type rotor, and electrodes for establishing conductive patterns in rotor-activated liquid. In this respect, novel flow-monitors provided by the invention depend neither on cirtical vane-to-electrode spacing nor on alternately interposing and removing the thickness of a rotor vane as a barrier for parts of a pattern(s) of conduction paths between electrodes.

In achieving this object of the invention, a vaned rotor is arranged so that its vanes sweep into and out of a position centered opposite a sensing electrode, without requiring the edge of each vane to block a tiny and close sensing electrode. In constrast to British Pat. No. 804,333, the electrode-to-vane-edge spacing need not be critically small and the electrode need not be tiny compared to the vane tip's width, for largely suppressing current paths in the liquid. Here, in constrast to my U.S. Pat. No. 4,333,354, a vane-representing signal excursion is produced as a vane approaches, is centered at, and leaves the sensing electrode. When a vane moves into position opposite a sensing electrode, the high resistivity material of the vane displaces some of the liquid that otherwise would provide part of the pattern of conduction paths.

The novel flow monitor in this aspect of the invention may be recognized by the characteristically broad signal produced as each vane passes the sensing electrode, representing an angle of vane motion that is many times the angle occupied by the vane's thickness. In a practical embodiment, the vane-to-vane spacing is such that, with the wide per-vane output signals, the ouput signal is quite similar to a sine wave.

The novel flow-monitoring operation can be performed with but two electrodes. Indeed, the two electrodes can use liquid-tight coaxial connections, with many attendant advantages.

As seen below, two exemplary embodiments of the invention involve but two electrodes that serve both for excitation and for providing an output signal that represents operation of a vaned rotor. In one embodiment, the rotor and at least the sensing electrode are in the form of a probe that extends into a flow passage and intercepts only a small part of the cross-section of the flow passage. The other is an in-line flow sensor where a turbine-type rotor is activated by the whole cross-section of liquid flowing in the passage.

Another object of the invention, in a second of its aspects, resides in providing novel flow monitors of the kind that involve amplitude modulation, developed by an impedance and two electrodes in series, the electrodes being exposed to liquid that exhibits some electrical conductivity. In this aspect of the invention, the circuit of a novel flow monitor provides a common constant excitation voltage across the electrodes that is substantially the same despite a wide range of different resistivities of the liquid whose flow is to be monitored. The d-c or other voltage across the flow sensor's electrodes is the excitation voltage when the flow rate is zero. The actual voltage across the electrodes at significant flow rates is the excitation voltage combined with flow-representing modulation. The circuit is self-adjusting so that substantially the same excitation voltage (plus modulation) develops across the flow sensor whether the resistivity of the liquid is low or high, as when sea water or tap water is being monitored.

Maintaining the d-c or other excitation voltage at a constant value when the apparatus is used for monitoring various liquids having diverse resistivities has the effect that the amplitude of the flow-representing signals is essentially unaffected by differences in liquid resistivities encountered in using the flow monitor. Thus, the sensitivity of the flow monitor is maintained despite diverse properties of the liquids whose flow is to be monitored. As a related additional feature, this flow monitor's circuit, which maintains a constant, consistent excitation voltage on the electrodes, is effective in providing a high level of the input impedance at flow-representing frequencies, serving as a constant-current source for enhanced output signal levels despite the high resistance that develops between the electrodes.

Two different forms of such novel flow monitors are described in detail below. In one form, the electrodes are energized by a direct-current source that includes a long time-constant an essentially, consistent excitation circuit arranged to maintain constant voltage across the electrodes. The excitation voltage drop between the electrodes is modulated by a flow-activated device. In another form, the excitation applied to the electrodes is essentially alternating-current at a voltage that is constant, and the a-c voltage appearing across the electrodes is modulated by a flow-activated device. The d-c an a-c excitation voltages are constant in the sense that they are maintained at an established essentially consistent, common value despite diverse resistivities of liquids encountered in the use of the flow monitors, and despite supply of the excitation current to the electrodes through a portion of the circuit that also provides high impedance in series with the electrodes at flow-representing frequencies.

In the flow-monitor circuits detailed below, the impedance in series with the electrodes is so high as to constitute a constant-current source at flow-representing signal frequencies, thus efficiently developing flow-representing signals despite the usually high resistance that after exists between the electrodes.

A still further object of the invention relates to flow monitors of the type that use electrodes in liquid of limited electrical conductivity. Pursuant to this object, direct-current excitation is applied thorugh a long-time-constant network to the electrodes that develop flow-representing signals. Circuit considerations, in practice, require imposition of a high level of excitation voltage, e.g. 5 to 7.5 volts. Where direct current excitation is applied, the positive electrode or anode tends to be consumed by a depleting action, which may well foreshorten the useful life of the apparatus. Moreover, it is desirable because of practical considerations to make the relatively small sensing electrode positive and the electro-chemical removal of metal is concentrated in its small area. Direct-current excitation of the small sensing electrode, energized as the anode, is made both feasible and economical by making the exposed active portion of the sensing electrode of platinum, graphite or gold, which are virtually immune to electro-chemical depletion. The companion or return electrode, as a cathode, can be made of any conductor that is suitably resistant to corrosion when exposed to the liquid, such as brass and stainless steel in flow sensors for water.

The nature of the invention, including its further features and advantages, will be more fully appreciated from the following detailed description of illustrative embodiments that are shown in the accompanying drawings.

BRIEF DESCRIPTION OF THE DRAWINGS

FIG. 1 is a fragmentary elevation of a probe form of turbine-type flow sensor, being the mechanical or structural portion of a novel flow monitor;

FIG. 2 is a fragmentary view of the flow sensor of FIG. 1, as seen from the broken vertical plane 2—2 in FIG. 1;

FIG. 3 is a fragmentary vertical cross-section of the flow sensor of FIG. 1, at the plane 3—3 in FIG. 1;

FIG. 4 is a cross-section of the flow sensor of FIG. 1 at the plane 4—4 in FIG. 1, looking up;

FIG. 5 is a diagrammatic view of the flow sensor of FIGS. 1-4, installed in a pipe made of insulating plastic, including a pattern of current paths that develop when energized, in the absence of the flow sensor's rotor;

FIG. 6 is a view like FIG. 5, having a grounded metal pipe;

FIG. 7 is a vertical cross-section of a modified flow sensor like that of FIGS. 1-4, as viewed at a plane parallel to FIG. 1 along the axis of the flow-sensor's support;

FIG. 8 is a vertical longitudinal cross-section of an in-line form of turbine-type flow sensor, being the mechanical or structural portion of another novel flow monitor;

FIG. 9 and 10 are vertical cross-sections of the flow sensor of FIG. 8 as seen at the planes 9—9 and 10—10, respectively, in FIG. 8.

DETAILED DESCRIPTION OF THE ILLUSTRATIVE EMBODIMENTS

Figure 11:
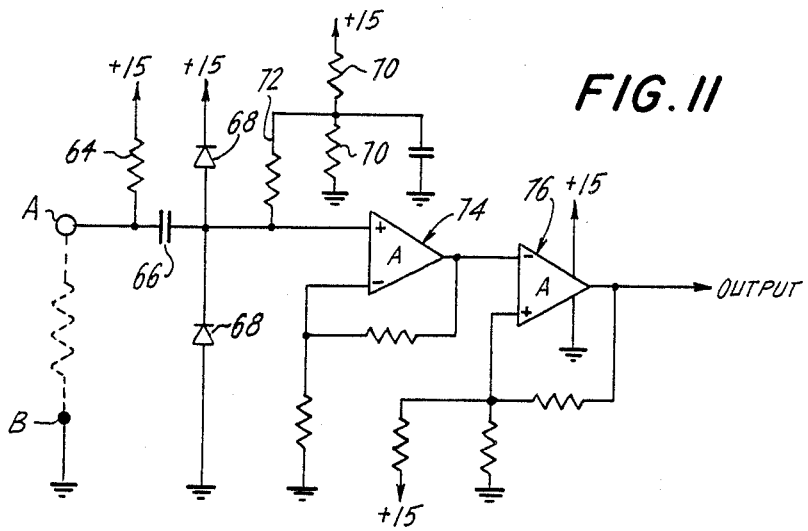
FIGS. 11, 12 and 13 are wiring diagrams of three alternative circuits, forming novel flow monitors incorporating any of the flow sensors of FIGS. 1-10.

In FIGS. 1-6, the illustrative flow sensor includes a supporting tube 20 carrying a frame that includes top cross member 22, side rods or tubes 24 and bottom cross member 26, all of brass in this embodiment. Bearings 28 fixed to side elements 24 support rotor 30 made of polysulfone or polypropylene or special grades of nylon or other insulation whose resistivity is much higher than that of tap water. For example, the resistivity of the rotor's material is $10^{11}$ to $10^{14}$ ohm-centimeters, being much higher than the usual resistivity of tap water. Rotor 30 has a number of equally spaced vanes 30a that spiral along hub 30b. In FIG. 1, rotor 30 is shown diagrammatically, disregarding the spiral form of the vanes.

In an example, rotor 30 has four equally spaced vanes 30a that spiral along the hub 30b; the radially outermost edges of the vanes may slant 30° to a plane containing the rotor's axis; the diameter of the rotor from edge-to-edge of an opposite pair of vanes is 0.80 inch; the hub diameter is 0.200 inch and 0.45 inch long; the vane thickness is about 0.035 inch, the vanes tapering somewhat from their outer edges to 0.055 inch at the hub; and the outer edges 30c may be flat as shown in FIG. 3, although they may also be rounded or thinned to a sharp edge. The leading and trailing extremities of the vanes (at bearings 28) are advantageously thinned so as to minimize turbulence, simulating turbine blades.

At the lower end of supporting tube 20, set in top cross piece 22 of the frame, there is a sensing electrode 32 of metal (discussed further below) sealed by a fine O-ring in a pre-formed insulator 34 which, in turn, is sealed in metal cross piece 22. Epoxy insulation 36 is a formed-in-situ insulating plug in tube 20 adhered to insulator 34 and electrode 32. A lead wire 32a extends from electrode 32 to an external terminal (not shown). With a rotor 30 of dimensions appearing above, an illustrative non-critical clearance of 0.040 to 0.050 inch between sensing electrode 32 and the vane edges 30c (as they pass the sensing electrode) is suitable. With rotor 30 dimensioned as above, electrode 32 is, for example, 0.125 inch in diameter. Making electrode 32 smaller, e.g., 0.060 inch in diameter or even smaller e.g. 0.020 inch in diameter, changes only slightly the shape of the signal that develops (see below) when the apparatus is in operation. The outer diameter of insulator 34 in an example is 0.375 inch but that is not critical either. Instead of the preformed insulator 34 as shown, an insulating O-ring that provides approximately 1/16-inch clearance around sensing electrode 32—all other dimensions of the above example remaining unchanged—has proved successful. The clearance between the sensing electrode and the vane edges' path approximates or is somewhat larger than the thickness of the vanes at their outer edges in successful examples.

FIG. 7 represents a modification of the flow sensor of FIGS. 1-4. In FIG. 7, two rotors are used, each with its own sensing electrode. Components of FIG. 7 corresponding to identical parts of FIGS. 1-4 have the same reference numbers, and modified parts have primed numbers. With the following exceptions, the description of FIGS. 1-4 applies to FIG. 7. (As in FIG. 1, the spiral vanes of the rotor are shown diagrammatically in FIG. 7.)

The flow sensor of FIG. 7 has two rotors, rotor 30 as in FIG. 1 and a second rotor 30' having a parallel axis. Rotor 30' is the same in all respects as rotor 30 except that the spiralling of vanes 30a' is opposite to that of vanes 30. Sensing electrode 32' with its insulator 34' is mounted in lower cross-piece 26', the latter being carried by parallel side frame parts 24'. Lead 32a' threads along one of the side frame parts 24', made tubular to accommodate lead 32a'. The provision of two rotors as in FIG. 7 serves the purposes described in my U.S. Pat. No. 4,399,696. To the extent applicable, that description is incorporated here by reference. Briefly, the flow to be monitored may have a spin component, which would introduce a measurement error; but where two rotors with reversely spiralled vanes are used, their sensed outputs being combined, the error is largely compensated.

At the top of tubular support 20 of the probe there are two terminals 38 and 38' for leads 32a and 32a'. Tube 20 can be used as a ground or return-circuit connection for brass frame structure 20, 22, 24' and 26' when that structure is used as a second electrode, as discussed below.

A still further modification of the flow sensor of FIGS. 1-4 is shown in FIGS. 8-10. Parts in FIGS. 8-10 that are identical to those in FIGS. 1-4 bear the same numbers, doubly primed. Accordingly, rotor 30" in FIGS. 8-10 is identical in all respects to rotor 30 in FIGS. 1-4, including the illustrative materials and dimensions.

In FIGS. 8-10, rotor 30" is mounted coaxially within a length of metal pipe 40 on bearings formed in flow-straightening units 42 and 44 which are fixed in pipe 40 at positions upstream and downstream in relation to the rotor. Units 42 and 44 each has a hub of the same diameter as rotor 30", and they are of molded insulation. Each unit has many vanes, e.g. eight vanes, extending radially out from its hub and against the inner surface of the pipe. The vanes are parallel to the pipe and to the hubs; they straighten the flow pattern, eliminating any spiralling or spin component of the flow.

Sensing electrode 44 is of metal, having an exposed surface flush with the inner surface of the pipe. An O-ring 46 as of neoprene or other suitable insulation surrounds electrode 44 and seals it in place against leakage. An insulating member 47 around electrode 44 spans the O-ring and bears against the outer surface of the pipe. Member 47 forms part of an electrical connector 48 that includes an outer metal terminal 50 and a pin terminal 52. Sensing electrode 44 is connected to pin terminal 52, and insulating washer 54 locates pin terminal 52 securely within outer terminal 50. A metal band 56 clamps connector 48 to pipe 40 and helps to secure sensing electrode 44 in position.

As in the example of FIGS. 1-4, the outermost edges of the rotor's vanes of FIGS. 8-10 are spaced by 0.040 to 0.050 inch from sensing electrode 44, and the vane edges have the same clearance from the cylindrical inner surface of the pipe 40.

For operating the flow sensor of FIGS. 1-4, electrical excitation is applied between sensing electrode 32 and another electrode that develops a pattern of current paths in the region occupied by rotor 30. When the probe of FIGS. 1-4 is used in a pipe 60 of insulation, electrode 32 and frame 22, 24, 26 serve as opposite electrodes, and current paths develop within frame 22, 24, 26 as indicated in FIG. 5. While not separately shown, essentially the same current paths develop within grounded frame 22, 24, 26 when the pipe in FIG. 5 is of metal, grounded or not grounded. In FIG. 6, structure 22, 24, 26 is insulated from the metal pipe 62 and electrical excitation is applied between sensing electrode 32 and pipe 62. Based on test results, almost the same pattern of current paths develops within frame 22, 24, 26 as in FIG. 5. A first pattern of current paths evidently develops between pipe 62 and metal frame structure 20, 22, 24, 26 as indicated in FIG. 6, and a second pattern of conducting paths like that in FIG. 5 develops between that frame structure and sensing electrode 32. The first pattern of current paths connects pipe 62 to frame 20, 22, 24, 26 which then serves as a return electrode.

Without need for further illustration, it will be recognized that a similar pattern of current paths develops in the flow sensor of FIGS. 8-10 when excitation is applied between sensing electrode 44 and pipe 40. The conduction paths are at a maximum when rotor 30" is in the position represented in solid lins in FIG. 10. The current paths extend between electrode 44 and pipe 40 not only in the plane of FIG. 10 but also in the vertical plane perpendicular to FIG. 10 and all the planes between them. When a vane is in the position represented in FIG. 10 in dotted lines, centered opposite electrode 44, the total conduction between electrodes 40 and 44 decreases by a readily measureable amount. The decrease can be explained by observing the effect of the rotor vane: it displaces an equal volume of liquid. The conductivity of the vane may be considered virtually zero. Accordingly, displacing water from the vicinity of the sensing electrode has the effect of eliminating a portion of the total amount of conduction compared to the conduction with no vane near electrode 44. Of course, the same effect of current-path reduction occurs in the flow sensor of FIGS. 1-4, both when used in FIG. 5 and as in FIG. 6. A volume of water is displaced by a vane when it is aligned with a sensing electrode, in FIG. 3, 5 or 6. Arches current paths would develop along the slender space occupied by a vane (both in the planes of FIGS. 3, 5 or 6, and in the plane of FIG. 8) as part of the total pattern of current paths. However, the current paths in that space are virtually displaced by the insulating material of the vane when aligned with the sensing electrode. The liquid's resistance reaches a maximum as each vane moves into and out of alignment with the sensing electrode. One output signal wave of 360 electrical degrees develops whenever the rotor turns 360 physical degrees divided by the number of the rotor's vanes. The same kind of signal wave form develops (see below) despite a wide range of diameters of the sensing electrode, both narrower than and wider than the vane thickness. This helps to explain the successful performance of these flow sensors where there is a relatively large, non-critical spacing between the path of the vanes' edges and the sensing electrode. The increase in resistance between the flow-sensor electrodes due to a vane passing into and out of proximity to the sensing electrode persists through an angle that is much greater than the angle represented by the thickness of a vane. In the example below, the resulting vane-representing signal excursion has a duration in electrical degrees that is five or six times the angle represented by the vane thickness.

The angle represented by the thickness of the vane should be related to its electrical effect in yielding an output signal excursion. The cyclic output signal involves four cyclic waves of 360 electrical degrees for each revolution of the illustrative rotor, each wave including one vanerepresenting excursion. The dimensions of a four-vane rotor given above include a vane thickness of 0.035 inch near its outer edge and a rotor of 0.8 inch diameter, measured edge-to-edge of opposite vanes. The circumference of that rotor at the vanes' outer edges is 2.52 inches so that each 0.035-inch-thick vane occupies $0.035/2.52 \times 360 = 5$ physical degrees. However, because each revolution of the rotor produces four cyclic signals each of 360 electrical degrees, what is here referred to as the electrical angle of a vane's edge of this rotor is four times its 5 physical degrees, i.e. 20 electrical degrees. This rotor with the non-critical clearance of 0.04 to 0.05 inch between the sensing electrode and the vanes' outer edges (which may be rounded edges) yielded vane-representing signals that were vastly wider than the vane thickness, expressed in electrical degrees. This performance characteristic results from a wholly different principle of operation from that in British Pat. No. 804,333 where critically close spacing of the vane edges to a slender sensing electrode was relied on to block current flow periodically.

In FIGS. 5, 6, and 8-10, the illustrated pipe defines a liquid flow passage. In each instance, a circuit is used that responds to vanes successively passing the sensing electrode. The circuit output can be calibrated in terms of volume-rate-of-flow, and the result can be integrated, giving a measure of volume.

The flow sensor of FIGS. 1-6, of FIG. 7 or FIGS. 8-10 in the circuit of FIG. 11 is highly effective for producing flow-representing signals. Terminal A of FIG. 11 represents sensing electrode 32, 32' or 44. Terminal B in FIG. 11 represents electrode 20, 22, 24, 26 of FIGS. 1-4 or 20, 22, 24', 26' of FIG. 7 or a metal pipe containing the flow-sensing probe of FIGS. 1-4 or FIG. 7, or metal pipe 40. Two such circuits may be used to operate the two-rotor probe of FIG. 7.

A direct-current supply, e.g. 15 volts, provides excitation for the sensor. With terminal B grounded and connected to the (−) d-c supply terminal, terminal A is connected to resistor 64 which, in turn, is connected to the (+) d-c supply terminal. Resistor 64 may be large so as to provide an approximation of a constant current supply to terminal A where the flow sensor of FIGS. 1-4, FIG. 7 or FIGS. 8-10 is to be used with various liquids, having diverse resistivities.

Because direct-current excitation is applied between electrodes A and B, making the sensing electrode positive might seem to be counter-indicated. The return electrode has much greater area and the depletion of metal would be more widely distributed if the return electrode were made positive, assuming the same value of excitation current. Moreover, depletion of metal from the return electrode, if positive, may be of little concern. However, the entire difficulty can be avoided by forming at least the exposed area of the sensing electrode, made positive, of gold, graphite or—ideally—platinum which has superior resistance to erosion by particles in the liquid. These materials when used as anodes in water are not subject to electro-chemical depletion, in the way anodes are ordinarily consumed in electroplating processes, i.e., they may be called electro-chemically inert. Doing this is economical because the area of the sensing electrode is characteristically small. Such electrodes may be expected to have a useful life, conservatively, of twenty five years with tap water.

Signal variations at terminal A due to the rotor vanes passing the sensing electrode are coupled by capacitor 66 to high-gain operational amplifier 74. Diodes 68 provide spike suppression to protect the operational amplifier in case of potentially damaging spurious signal spikes that might appear. Voltage divider 70 provides bias for amplifier 74, through input load resistor 72. Resistor 64 in an example is 100,000 ohms and resistor 72 is 10 Meg. Ohms. The output signal of amplifier 74 is shaped in circuit device 76 to yield an output of square waves or pulses. As is customary, such signals can be fed to a counter to accumulate a measure of volume, or they can be used in a flow-rate indicator.

Figure 12:
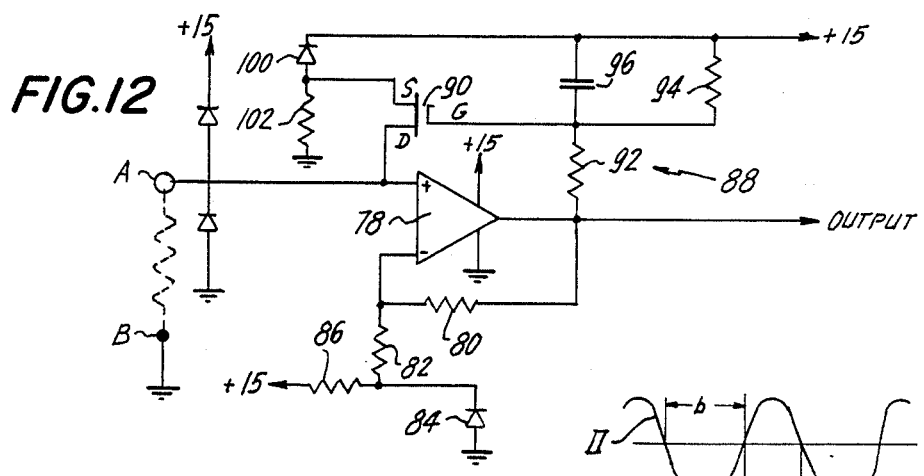

The circuit of FIG. 12 represents a considerable improvement over that of FIG. 11, enabling high output to be obtained despite a wide range of diverse liquid resistivities that may be encountered in the use of the apparatus with various liquids such as sea water or tap water, monitored separately. The circuit of FIG. 12 is effective to maintain a constant value of d-c operating voltage across terminals A and B despite such diverse resistivities when the rate of flow is zero. In turn, the amplitude of the flow representing signal is maintained at a constant value despite such different liquid resistivities, due to the maintenance of a constant value of excitation voltage that the circuit develops across the flow sensor despite its use with various liquids having different resistivities. The same circuit serves in addition as a constant-current source with respect to the flow-representing signals because it affords enormous impedance at signal frequencies. Due to that impedance, the maximum aplitude of signal is derived from the flow sensor.

As in the case of FIG. 11, terminals A and B in FIG. 12 represent the sensing electrode and the return electrode, respectively, of each flow sensor in FIGS. 1-4, FIG. 7 and FIGS. 8-10.

Figure 13:
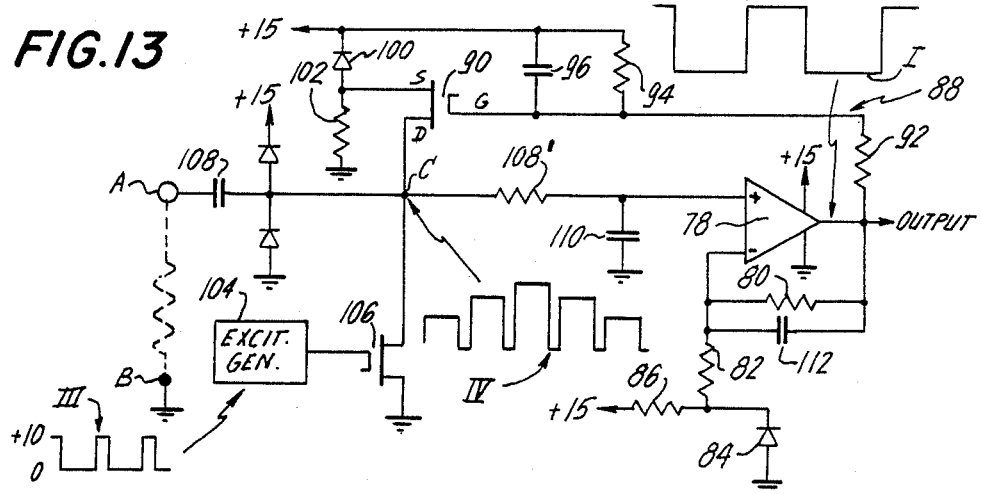

Input terminal A is connected to the (+) input of highgain operational amplifier 78, a d-c differential amplifier. Resistor 80 provides a feedback path to the (−) input of amplifier 78. The (-) input has a bias connection through resistor 82 to the junction of resistor 86 and Zener diode 84, these being connected in series between the (+) terminal and the grounded (−) terminal of the d-c- supply. In an example, amplifier 78 is half of an integrated circuit device Type LM358N made by National Semiconductor Co. Resistors 80 and 82 are 10 Meg. ohms and 47,000 ohms, respectively, yielding such high gain as to develop squared output wave represented by curve I (FIG. 13). With much lower gain, the input signal would be linearly reproduced in the output as curve II, FIG. 13.

The circuit of FIG. 12 includes a feedback network 88 connected to the (+) input of operational amplifier 78 for providing constant excitation voltage at termainal A that is sustained at a constant value despite use of the flow monitor with liquids having diverse resistivities. Rotor 30 or 30" thus develops the same signal level at terminal A and the flow monitor's sensitivity is sustained with diverse resistivities of the liquids. In addition, as explained below in detail the network developes very high impedance at signal frequencies at the (+) input of amplifier 78, serving in this way to constitute a constant-current source for the flow-representing signals that the flow sensor develops. This is true not only when the flow sensors of FIGS. 1-10 are used, but also when similar forms of flow sensors are used such as that disclosed in my applicaiton Ser. No. 749,267 filed June 27, 1985 that is incorporated here by reference. Use of a circuit containing network 88 or its equivalent is particularly advantageous where it is anticipated that any one flow sensor may be used to monitor the flow of various liquids having different resistivities.

Network 88 includes a field effect transistor 90, here a P-type device Type BS250 made by Siliconix. This transistor is a solid state transducer having a high-gain phase-inverting characteristic. Its output current gate G. The gate of FET transistor 90 is connected to the junction of resistors 92 and 94 that are connected in series, forming a voltage divider between the output of operational amplifier 78 and the positive d-c supply terminal. Large capacitor 96 shunts resistor 94. In an example, the values of resistors 92 and 94 are 1.0 Meg. Ohms and 2.2 Meg. Ohms, respectively, and the value of capacitor 96 is 10 Mfd. Source S of FET transistor 90 could be connected to the d-c positive terminal. However, here it is biased below that supply voltage, e.g. by 5.0 volts, developed as by Zener diode 100 connected in series with resistor 102 between d-c positive and ground. This is a detail that accommodates differences among commerical FET transistors 88, for more consistent performance among networks 90 in a succession of flow monitors. Drain D of the FET transistor is connected to electrode A and the (+) input of operational amplifier 78. Drain D provides the excitation current for electrodes A and B. The (+) input of amplifier 78 and electrode A are stabilized close to the excitation voltage across Zener diode 84.

The long-time-constant impedance network 92, 94, 96 controls gate G of FET transistor 90 (see the illustrative components values above) holding gate G at the filtered, steady voltage which develops at the junction of resistors 92 and 94. This prevents the current of drain D from changing rapidly. Therefore, the circuit into which sensing electrode A "looks" has very high impedance at flow-representing signal frequencies—of the order of several megohms in an example. Resistance changes that occur between electrodes A and B due to flow-induced turning of the vaned rotor are efficiently converted into an input signal to the (+) input of operational amplifier 78 being a modulation of the constant excitation voltage. The portion of circuit of FIG. 12 which is interposed between terminal A and the (+) terminal of the d-c- supply thus has high imput impedance at flow-representing signal frequencies. That impedance in series with electrodes A, B of the flow sensor is much higher than that between electrodes A and B when used with tap water and vastly higher than that of the flow sensor when used with sea water. That series impedance, in an example, is many megohms whereas the resistance between the flow-sensor's electrodes for tap water is typically 5000 ohms, but it can be mucher higher. The changes in resistance between electrodes A and B due to turning of the rotor are much smaller than the total A-to-B resistance. Accordingly, the current supplied to the flow sensor electrodes undergoes virtually no change as a the rotor turns, that current being the current of drain D as controlled by gate G which is held at the filtered d-c voltage at the junction of resistors 92 and 94. In turn, the composite voltage at electrode A undergoes the full range of flow-representing modulation corresponding to the resistance change betweeen electrodes A and B caused by motion of the rotor or other flow-driven element. If the input impedance of the circuit were equal to the resistance between the electrodes, half of the signal voltage would be lost internally between electrodes A and B. High input impedance is important because of the low level of conduction between the electrodes for the high resistivity liquids that may be encountered.

The d-c excitation voltage in FIG. 12 is substantially the same as that established by the voltage divider 84, 86 so that a constant level of excitation voltage is provided for electrodes A and B. This voltage is fixed by Zener diode 84, being 7.5 volts in an example.

Use of the d-c excitation provided in FIG. 12 for the flow-sensor electrodes is of value where the flow monitor is installed at an isolated location, energized by a long-life battery. As stated above, d-c excitation avoids the current drain needed in a-c excited flow monitoring apparatus for operating a high frequency excitation source. Where those factors are not of concern, a-c or equivalent pulsed excitation of the electrodes may be of advantage, eliminating the whole issue of electro-chemical attack of the electrodes. Brass, stainless steel and the like may be used for the electrodes, any electrode material that has suitable corrosion-resisting properties when exposed to the liquid. FIG. 13 is a modification of the circuit of FIG. 12, involving a-c excitation of the electrodes.

The components that are the same in FIG. 13 as in FIG. 12 bear the same numbers, and their description and illustrative values are not repeated.

In FIG. 13, signal III of excitation-frequency, provided by generator 104, triggers FET transistor 106 into heavy conduction, monentarily driving tap C to ground potential. As is usual, the excitation frequency is much higher than the flowrepresenting signal frequency at the highest flow rate to be monitored. When the rotor of the flow sensor between electrodes A and B is stationary, junction C operates at the d-c level of the (+) input of amplifier 78 in FIG. 13, so that the wave-form at junction C is a series of equalamplitude square-top waves. When coupled to terminal A through d-c blocking capacitor 108, this becomes constant a-c excitation voltage applied across electrodes A and B of the flow sensor. The value of this excitation voltage is established by operation of amplifier 78 with the feedback networks to its (+) and (−) inputs as in the apparatus of FIG. 12; the excitation voltage is substantially the same wether the resistivity of the liquid in the flow sensor is low or high.

The a-c square-wave excitation of the electrodes A and B becomes a modulated wave when the rotor of the flow sensor turns. The wave-form IV develops at junction C, having the same modulation wave-form as that produced in FIG. 12. The signal is passed through a carrier-suppression filter including series resistor 108'and shunt capacitor 110, yielding a wave at the (+) input of amplifier 78 like curve II. Due to its high gain, the amplifier produces square-wave flow-representing output signal I.

The particular form of a-c excitation described above results in a modulated signal IV at junction C having no information content in its downward excursions. All of the flow-representing content is in the upward excursions of wave IV. The downward excursions are here made short, and the upward excursions have a long duty cycle, for example 90%. This modulated waveform is converted to the modulation envelope at input (+) of amplifier 78 by the averaging effect of filler 108, 110. That signal has the wave-form of curve II, but its amplitude is proportional to the duty-cycle of the upward a-c excursions. Thus, a long duty-cycle of the upward excursions is advantageous.

The circuit of FIG. 13 has all of the characteristics described above for the circuit of FIG. 12 except that the excitation applied to sensor electrodes A, B in FIG. 13 is alternating current. The a-c voltage or amplitude of the excitation is virtually the same for diverse resistivities of the liquids encountered in using the apparatus, and the input impedance of the excitation-supplying circuit is vastly greater than the resistance that develops between electrodes A and B.

The circuits of FIGS. 12 and 13 are beneficial not only with the flow sensing structures of FIGS. 1–10, but also with other flow sensors for liquid having limited conductivity, for example the flow sensor in my application Ser. No. 06/749,267 mentioned above.

As noted above, curve II (FIG. 13) represents the output of amplifier 78 when its gain is adjusted to provide linear response to the input signal. Accordingly, curve II also represents the variations of resistance between terminals A and B. This curve is typical of the flow sensors of FIGS. 7–10. An example of Curve II was produced using the flow sensor of FIGS. 1–5 having a rotor 30 of four vanes with the dimensions given above, with electrode 32, 0.040 inches to 0.050 inches from the path of the vanes' edges and with a 0.125 inch diameter sensing electrode 32. Rounded upward signal excursions a in this example were typically 90° to 110° long and the reverse rounded signal excursions b were 250°–270° long, Curve II being an approximation of a sine wave. Signals produced by other examples of the sensor of FIGS. 1–5 were closer approximations of a sine wave, with upward and downward curved excursions that were more nearly equal in duration.

In the example above, signal excursion a represents the resistance variation between the flow sensor in FIGS. 1–5 as a vane approaches and leaves sensing electrode 32. The thickness of each vane near its outer edge was about 0.035 inches and the center to center arcuate distance between the outer edges of two successive vanes was 0.63 inches. Accordingly each vane occupies only 360°×0.035/0.63=20° (electrical degrees). This is only 1/5 or 1/6 of the angle of the upward signal exursions a of signal II in the example above. The vane-representing signal excursions are thus may times the thickness of the vanes expressed in electrical degrees.

In another example where the diameter of the sensing electrode was changed to 0.020 inch without changing any of the other dimensions, essentially the same signal II was produced. A flow sensor simulating that in British Pat. No. 804,333 was tested for comparison, using the same construction as in FIGS. 1–5, with a sensing electrode of 0.02 inch diameter. One of the rotor's vanes was extended to have a clearance of only 0.005 inch from electrode 32. As a result, the close space vane produced a sharp output spike rising from a flat reference plateau. The spike had a duration that approximated the thickness of the vane at its outer edge expressed in electrical degrees.

The edge of the close-spaced vane in the test was flat whereas the vanes of the illustrative flow sensors can be flat, round or sharp and as already noted, the clearance of the test vane from electrode 32 was critically small. Demonstrating the different principle here as constrasted with the British patent, a generous, non-critical electrode-to-vane clearance is effective here for providing the desired flow-representing signals.

What is claimed is:

1. Apparatus for monitoring the flow of liquid such as tap water having limited electrical conductivity, including means defining a flow passage, a rotor having a hub and multiple vanes projecting from said hub to outer edges and disposed in the passage so as to be driven by flowing liquid, the electrical resistivity of the vanes being much higher than that of the liquid whose flow is to be monitored, a sensing electrode having an active face exposed to the liquid and disposed opposite to the path of the vanes' outer edges, the extent of said active face of the sensing electrode along said path being only a small portion of the arcuate spacing between the edges of successive vanes of the rotor, a return electrode exposed to the liquid and disposed so that a pattern of electric current paths develops through the liquid between the sensing electrode and the return electrode when excitation is applied thereto and so that the pattern of current paths is modified by said vanes, and an electric circuit including impedance means connected in series with said electrodes and excitation means and output signal deriving means both of which are connected to said electrodes for developing and utilizing amplitude-varying signals in response to turning of the rotor, said return electrode being disposed in relation to said active face of the sensing electrode so that, in use, maximum resistance between the electrodes develops only as the edge of each vane passes into and out of alignment with the sensing electrode and so that only one vane-representing signal excursion is developed across said electrodes for each vane during the rotation of the rotor, the sensing electrode being spaced from the path of the vanes' edges so that, for all widths of the sensing electrode from narrower than to much wider than the thickness of a vane when measured along said path of the vanes, the duration of each vane-representing signal excursion that develops across the electrodes as each vane passes the sensing electrode has an electrical angle at least several times the electrical angle represented by the thickness of each vane at and near its outer edge.

2. Flow monitoring apparatus as in claim 1, wherein the return electrode exposed to the liquid is disposed in relation to the active face of the sensing electrode so that spreading paths of conduction develop in the liquid at opposite sides of a vane that is centered momentarily opposite to said sensing electrode.

3. Flow monitoring apparatus as in claim 1, wherein the return electrode exposed to the liquid is disposed in relation to the active face of the sensing electrode so that spreading paths of conduction develop in the liquid at opposite sides of a vane that is centered momentarily opposite to said sensing electrode, and so that paths of conduction develop in the liquid essentially along the space vacated by such centered vane when it moves away from the sensing electrode.

4. Flow monitoring apparatus as in claim 1, wherein the vane-to-vane spacing is so limited that the output signals resemble a sine wave.

5. Flow monitoring apparatus as in claim 1, wherein the width of the active face of the sensing electrode along the path of the vanes' movement is substantially greater than the width of each vane's outer edge.

6. Flow monitoring apparatus as in claim 1, wherein the clearance between the sensing electrode and the outer edges of the vanes as they pass the sensing electrodes is at least equal to the width of each vane's outer edge.

7. Flow monitoring apparatus as in claim 1, wherein the clearance between the sensing electrode and the outer edges of the vanes as they pass the sensing electrodes approximates the width of each vane's outer edge.

8. Flow monitoring apparatus as in claim 7, wherein the width of the active face of the sensing electrode along the path of the vane's movement is substantially greater than the width of each vane's outer edge.

9. Flow monitoring apparatus as in claim 1, wherein said electric circuit comprises a direct current supply arranged to bias said sensing electrode positive, and wherein at least a surface layer of said sensing electrode exposed to the liquid is inert electrochemically in said liquid.

10. Flow monitoring apparatus as in claim 1, wherein said excitation means and said output signal deriving means comprise means for maintaining a constant level of excitation voltage across said electrodes despite any sustained resistivity among diverse resistivities of the liquid between the electrodes.

11. Flow monitoring apparatus as in claim 1, wherein said output signal deriving means has an impedance that is vastly greater than the resistance that develops between the electrodes when exposed to liquid of highest resistivity whose flow is to be monitored.

12. Flow monitoring apparatus as in claim 1, wherein said output signal deriving means includes an operational amplifier having (+) and (−) inputs and which is coupled at its (+) input to one of said electrodes, and a feedback network comprising a long-time-constant resistor-capacitor combination and an amplifying device for maintaining said (+) input and said one electrode at a constant level of excitation voltage while providing high input impedance to flow-representing signals at said (+) input.

13. Flow monitoring apparatus as in claim 1, wherein said output signal deriving means includes an operational amplifier having (+) and (−) inputs and which is coupled at its (+) input to one of said electrodes, and a feedback network comprising a long-time-constant resistor-capacitor combination and an amplifying device, said amplifying device having a direct-current supply connection and an output connection to said (+) input and an input control connected to said long-time-constant excitation resistor-capacitor combination, for sustaining constant voltage at said (+) input while developing high input impedance at said (+) input at flow-representing signal frequencies.

14. Flow monitoring apparatus for liquid that exhibits limited electrical conductivity, including a flow sensor comprising a localized sensing electrode and a return electrode having a much larger area than said sensing electrode exposed to the liquid and a flow-activated device having portions movable at flow-representing frequency in the space between said electrodes for modifying the resistance between said electrodes, and a circuit responsive to said flow sensor for providing flow-representing signals, said circuit including direct-current supply means for providing said electrodes with direct-current excitation arranged to render said localized sensing electrode positive relative to said return electrode, at least the portion of said localized sensing electrode that is exposed to the liquid being of a material that is essentially inert electrochemically during excitation while in the liquid whose flow is monitored.

15. Flow monitoring apparatus as in claim 14, wherein the material of said portion of the sensing electrode exposed to the liquid is one of the group consisting of platinum, gold and graphite.

16. Flow monitoring apparatus as in claim 14, wherein said portion of said sensing electrode exposed to the liquid is a layer of platinum.

17. Flow monitoring apparatus for liquid that exhibits limited electrical conductivity, including means defining a flow passage, a flow sensor comprising a localized sensing electrode and a return electrode disposed in relation to the liquid in the flow passage for developing distributed current paths through the liquid and a flow-activated device in the passage having portions movable at flow-representing frequencies in the space between said electrodes where said current paths are developed for modifying the resistance of the liquid in the passage between said electrodes, and a circuit responsive to said flow sensor for providing flow-representing signals, said circuit including self-adjusting excitation means coupled to said electrodes for providing sustained excitation voltage of an essentially single value across said electrodes regardless of which liquid may be in the passage among diverse liquids having a range of different resisitvities, said excitation means having substantial impedance at flow-representing frequencies, so that there is a composite voltage across the electrodes including said sustained excitation voltage and flow-representing modulation representing the operation of the flow-activated device.

18. Flow monitoring apparatus as in claim 17, wherein said circuit includes direct-current supply means for providing said electrodes with excitation voltage, a blocking capacitor between said direct-current supply menas and one of said electrodes, said direct-current supply means including a series impedance to said blocking capacitor and an intermittent short-circuiting device beween said series impedance and the other of said electrodes operable at a frequency greatly exceeding the flow-representing signals at the maximum flow rate to be monitored for converting the direct-current excitation to squared alternating-current excitation at the electrodes.

19. Flow monitoring apparatus as in claim 17 wherein said electrodes are exposed to the liquid in the flow passage.

20. Flow monitoring apparatus as in claim 19, wherein said excitation voltage is direct-current voltage conductively connected to said electrodes.

21. Flow monitoring apparatus as in claim 19, wherein said excitation voltage is alternating-current voltage.

22. Flow monitoring apparatus for liquid that exhibits limited electrical conductivity, including a flow sensor comprising a localized sensing electrode and a return electrode disposed in relation to the liquid for developing distributed current paths through the liquid and a flow-activated device having portions movable at flow-representing frequency in the space between said electrodes for modifying the resistance between said electrodes, and a circuit responsive to said flow sensor for providing flowrepresenting signals, said circuit including an operational amplifier haveing (+) and (−) inputs, the (+) input being coupled to one of said electrodes, a biasing and gain-control feedback network between the output and the (−) input of the operational amplifier, and dual means for both providing the electrodes with excitation and providing impedance at flow-representing frequencies in series with said electrodes, said dual means comprising a first resistor connected to the output of said operational amplifier, a second resistor and a capacitor in parallel therewith having first and second connections to said first resistor and a d-c supply terminal, respectively, and a phase-inverting device having a control electrode connected to said first connection and having an output connection to said (+) input of the operational amplifier.

23. Flow monitoring apparatus as in claim 22 said electrodes being exposed to the liquid in the passage, including a d-c blocking capacitor between said (+) input and said one of said electrodes, and modulating means connected across said blocking capacitor and said electrodes in series, said modulating means having an operating frequency greatly exceeding the flow-representing frequencies at the maximum flow rate to be monitored for converting the voltage at said (+) input of the operational amplifier to a-c excitation at said electrodes.

24. Flow monitoring apparatus for liquid that exhibits limited electrical conductivity, including:
I. a flow sensor comprising means defining a flow passage, first and second electrodes disposed in relation to said passage so that, when the electrodes are electrically excited, a pattern of current paths develops in the liquid in the passage, and a flow-activated device in the passage for causing cyclic changes in the resistance between the electrodes at a frequency representing the rate of flow; and
II. a circuit connected to said electrodes for deriving flow-representing signals, said circuit including
  i. a high-gain d-c amplifier having an input coupled to said first electrode and having an output,
  ii. an impedance network between the amplifier's output and a d-c supply, said network having a junction and having long-time-constant filtering means for providing a voltage at said junction representing the output of the amplifier from which flow-representing signals have been filtered, and
  iii. means controlled by the voltage at said junction for supplying current to said first electrode at a substantially constant value of d-c or other excitation voltage across said electrodes regardless of which liquid may be present between the electrodes among various liquids having a range of different resistivities, said current-supplying means having substantial impedance for sustaining signals of flow-representing frequencies at said first electrode as modulation on the excitation voltage.

25. Flow monitoring apparatus as in claim 24, wherein said current-supplying means (iii) comprises solid-state means having a control electrode connected to said junction for controlling the excitation current to said first electrode and representing a constant current source for said first electrode at flow-representing frequencies.

26. Flow monitoring apparatus as in claim 24, wherein said network includes an impedance interposed between said junction and the output of the d-c amplifier for sustaining flow-representing signals and wherein said current supplying means comprises a field-effect transistor having a supply-to-drain current path arranged to supply excitation current to said first electrode, the gage of the field-effect transistor forming the connection of the current supplying means to said junction so that the field-effect transistor represents a constant current excitation source at flow-representing frequencies for said first electrode.

27. Flow monitoring apparatus as in claim 24, wherein said electrodes are exposed to the liquid in the flow passage.

28. Flow monitoring apparatus including means defining a flow passage, flow sensing means secured to said passage means, and a flow-activated device in the passage movable cyclically at flow-representing frequencies into proximity to said flow sensing means, said flow sensing means characteristically producing flow-representing signals as a modulation on applied excitation voltage and characteristically developing diverse ratios of excitation-voltage-to-current under diverse sustained operating conditions of the sensing means, and a circuit for providing flow-representing signals as a composite of an excitation voltage and a signal varying at flow-representing frequencies in response to cyclic movement of the flow activated device past the flow sensing means, said circuit including said flow sensing means and impedance means in series therewith and having self-adjusting excitation means for applying excitation voltage to said flow sensing means and for maintaining the excitation voltage across said flow sensing means essentially constant regardless of which of said diverse operating conditions may be in effect, wherein said self-adjusting excitation means includes an operational amplifier having an input connected to said flow sensor, a load impedance connected to the operational amplifier's output, a filtering impedance having a connection to the load impedance and being interposed between said connection and a d-c supply terminal, and a high-gain amplifier providing a coupling between said input of the operational amplifier and said connection for developing said impedance means in series with the flow sensor, the foregoing being so related that said load impedance imparts to said impedance means an essentially constant-current characteristic at flow-representing frequencies.

29. Flow monitoring apparatus including:

I. a flow sensor having means forming a passage for fluid whose flow is to be monitored, a cyclically movable flow-activated element in the passage, and sensing means for sensing the cyclic movement of the flow-activated element, said sensing means characteristically providing flow-representing signals as a modulation of applied excitation voltage and characteristically developing diverse ratios of excitation-current-to-voltage when operated under diverse sustained conditions of the flow sensor, and II. a circuit connected to said sensing means for deriving flow-representing signals, said circuit including
   i. operational amplifier means having a first input connected to said sensing means and having a second input and an output,
   ii. means for maintaining controlled bias at said second input, and
   iii. a feedback network for maintaining a constant bias on said first input and a constant d-c or other excitation voltage on said flow sensor regardless of which of said diverse operating conditions is in effect, said network providing substantial impedance at flow representing frequencies for sustaining flow-representing modulation on said excitation voltage.

30. Flow monitoring apparatus as in claim 29, wherein said feedback network includes a filter network connected to the output of the operational amplifier for providing at a point in the filter network a control voltage from which flow-representing signals have been filtered, and solid state transducer means having a control electrode connected to said point in the filter network and having an output electrode connected to said first input for maintaining substantial balance at said inputs and for providing a constant-current source for said first electrode at flow-representing frequencies.

* * * * *